United States Patent [19]

Heynisch et al.

[11] Patent Number: 4,761,787
[45] Date of Patent: Aug. 2, 1988

[54] TRANSVERSELY EXCITED WAVEGUIDE LASER

[75] Inventors: Hinrich Heynisch, Grafelfing; Klemens Hubner, Ottobrunn; Hans Krüger, Munich; Hubert Weber, Augsburg, all of Fed. Rep. of Germany

[73] Assignee: Siemens Aktiengesellschaft, Berlin and Munich, Fed. Rep. of Germany

[21] Appl. No.: 134,094

[22] Filed: Dec. 17, 1987

[30] Foreign Application Priority Data

Dec. 17, 1986 [DE] Fed. Rep. of Germany ....... 3643133

[51] Int. Cl.⁴ .............................................. H01S 3/04
[52] U.S. Cl. ........................................ 372/34; 372/64; 372/92; 372/83
[58] Field of Search .................. 372/64, 34, 61, 82, 372/83, 92

[56] References Cited

U.S. PATENT DOCUMENTS

| | | | |
|---|---|---|---|
| 4,429,398 | 1/1984 | Chenausky et al. | 372/64 |
| 4,577,323 | 3/1986 | Newman et al. | 372/64 |
| 4,620,306 | 10/1986 | Sutter, Jr. | |
| 4,688,228 | 8/1987 | Newman et al. | 372/64 |
| 4,703,489 | 10/1987 | Ross | 372/64 |
| 4,719,640 | 1/1988 | Chenausky et al. | 372/64 |

FOREIGN PATENT DOCUMENTS

| | | |
|---|---|---|
| 3009611 | 9/1981 | Fed. Rep. of Germany . |
| 3039634 | 4/1982 | Fed. Rep. of Germany . |
| 3327257 | 2/1984 | Fed. Rep. of Germany . |
| 3504403 | 8/1985 | Fed. Rep. of Germany . |
| 2071904 | 9/1981 | United Kingdom . |
| 2154788 | 2/1984 | United Kingdom . |

*Primary Examiner*—Leon Scott, Jr.
*Attorney, Agent, or Firm*—Hill, Van Santen, Steadman & Simpson

[57] ABSTRACT

A waveguide laser having a discharge channel and two cooling channels formed in ceramic parts have the cooling channels being broader than the discharge channel, and the cooling profile parts which contain the cooling channels being soldered to both sides of the discharge profile part containing the discharge channel. The discharge profile part is formed of a channel part and a cover part.

14 Claims, 1 Drawing Sheet

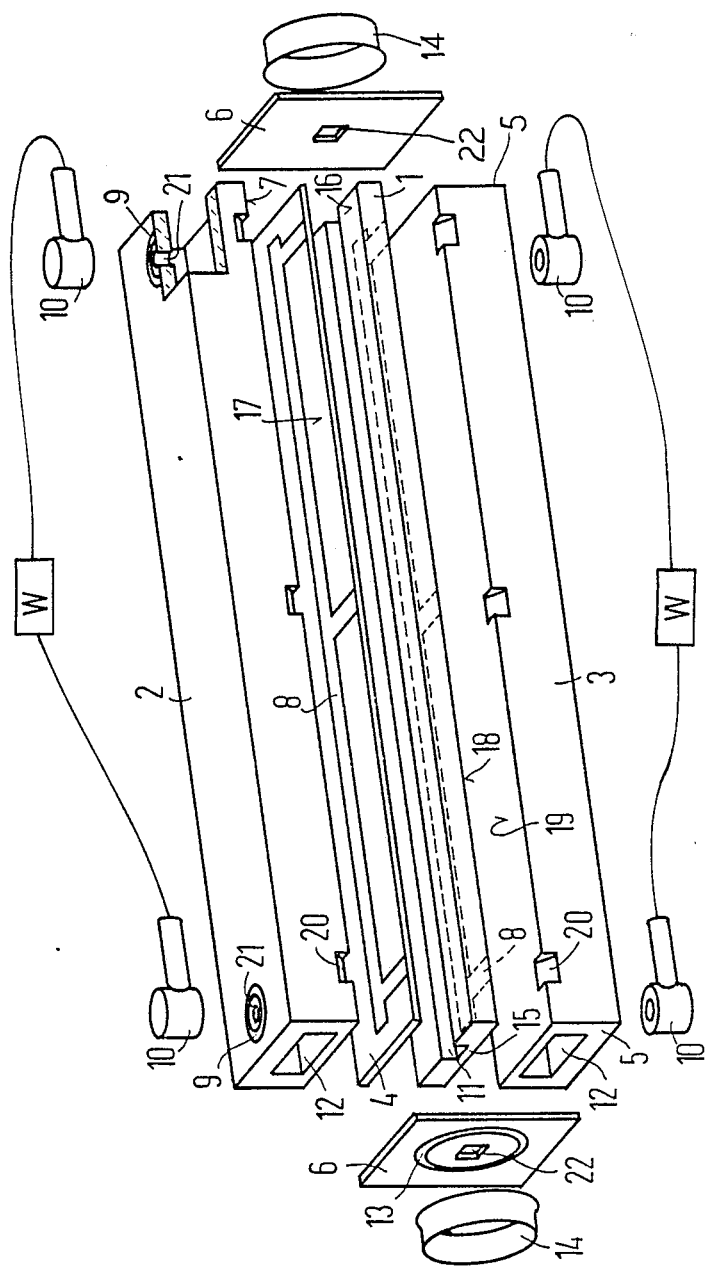

TRANSVERSELY EXCITED WAVEGUIDE LASER

BACKGROUND OF THE INVENTION

1. Field of the Invention

The present invention is related generally to a transversely excited waveguide laser having at least one discharge channel and two cooling channels arranged symmetrically thereto in a rod of insulating material.

2. Description of the Related Art

A transversely excited laser is disclosed in German published application No. 35 04 403 and corresponding Great Britain application No. 2,154,788. In a rectangularly profiled rod of ceramic are found in seperate grooves, a discharge channel, electrodes at both sides of the discharge channel, and cooling channels outside the electrodes. The grooves are covered with a cover member of rectangular cross section. The disclosed structure is poorly suited for high power lasers since the cooling of the discharge channel occurs over a relatively long path around the electrodes, resulting in a high temperature gradient in the ceramic. Since the structure is thermally asymmetrical relative to the discharge channel, bending of the ceramic rod can result, thus leading to a considerable reduction in laser power.

In German published application No. 33 27 257 and corresponding U.S. Pat. No. 4,620,306 is disclosed a transversely excited gas laser having a discharge channel of ceramic at whose outside wall metallic electrodes are applied. Cooling channels are formed in the electrodes. This device does not completly match the temperature coifficients between the cooling channel and the discharge channel. Since the matching of the temperature is coefficients is valid only for a specific temperature range even for optimally matched metals, thermal stresses cannot be entirely avoided.

In German Pat. No. 30 09 611 and corresponding Great British Pat. No. 2,071,904 is disclosed a method for manufacturing a waveguide laser member having a laser capillary and cavities radially connected thereto which is manufactured by an extrusion method. The cavities serve as supply reservoirs for the laser gas.

German Pat. No. 30 39 634 discloses the same form of laser waveguide member. The laser capillaries and cavities, however, are manufactured by a schoopage method. According to this patent, the cavities which are radially spaced from the discharge space should, amoung other things, also be used as cooling channels. The extruded embodiment, however, cannot be manufactured with the precision required for high efficiency.

SUMMARY OF THE INVENTION

An object of the present invention is to provide increased efficiency in lasers even for high laser powers. A transversely excited waveguide laser having a rod of insulating material, such as ceramic, in which at least one discharge channel groove and two cooling channels are arranged achieve this and other objects by providing at least one discharge channel element or profile and two cooling elements or profiles having approximately the same coefficient of temperature expansion, wherein the cooling elements are soldered at opposite sides of the discharge channel element. The individual elements, also referred to a profiles due to their substantially constant cross sections, can be manufactured in a simple apparatus and can be ground to size as required without difficulty. High precision in the mechanical dimensions can thereby be achieved. This high precision is also retained after the inventively shaped parts have been soldered together, since bending does not occur even during temperature fluctuations. This is especially true when the profile elements are soldered together with a glass solder. Only low soldering temperatures are required for soldering with such glass solder.

Assembly of the individual profiled parts also enables profiles to be used which have especially thin walls in the area of their solder surfaces. Extremely thin-walled regions are thus present between the discharge channel and the adjacent cooling channels.

An extremely small temperature gradient, for example of less than 2 degrees C., is realized in the ceramic rod even when high laser pump power densities are present and, thus, the high efficiency of the laser is preserved.

Easily surveyable conditions are achieved when the cross section of the discharge channel is axially symmetrical. For example, the discharge channel can either be rectangular or square, or can also present a rectangular or square deformed into a pillow-like outline with rounded sides, as recommended in the prior art. However, an especially advantageous heat transfer is realized when the limiting surface of the discharge channel facing toward the cooling channel and the generated surface of the cooling channel facing toward the discharged channel are planar and parallel to one another. When the cross section of the cooling channel is mirror-symmetrical relative to the surface normal on the corresponding limiting surface of the discharge channel, an advantage is also realized.

The discharge profile element is advantegously composed of a channel part and a cover part. The channel part contains a groove forming the discharge channel, whereby the cover part has the same wall thickness as the floor under the groove and has the same width as the discharge profile part. The cover part is arranged above the groove to thus enclose the discharge channel. Two adjacent cooling profile parts are formed of mutually identical extruded elements.

An interconnect, such as a metallic surface lead, which is suitable as an electrode for transverse excitation of the laser gas is advantageously applied to the solder surfaces of the discharge profile element at the respective sides facing away from the discharge channel.

An especially temperature tolerant laser is achieved when all profile elements, and end plates soldered thereto to form a rod, are composed of the same material and are soldered together with glass solder. The end plates are provided with a recess or opening in the region of the discharge channel, and mirror carriers of metal having a temperature coefficient matched to that of the ceramic are soldered onto the end plates. This enables adjustable mirrors to be applied to the end plates.

The two cooling profile parts advantageously have rectangular sections, and include bores in the region of the end faces which extend outward from the cooling channel so that cooling water connections can be soldered onto the regions of these bores. The rectangular shape facilitates the positioning of the connections for the cooling water and also provides for especially uniform discharge temperatures. A uniform cooling for a high dimensional accuracy in the laser can be achieved when the cross-sectional area of the discharge channel lies in a range of 1 through 16 square mm. An advantageous temperature gradient is achieved when the entire wall thickness between the discharge channel and the neighboring cooling channel is not greater than the extent of the discharge channel in the direction of the surface normal on the solder surfaces of the discharge profile.

All ceramic parts in the present device are preferrably formed of $Al_2O_3$ (alumina) ceramic, although BN (Boron Nitride) or AlN (Aluminum Nitride) can also be used. The invention is especially well suited for use with high power $CO^2$ waveguide lasers having high efficiency.

BRIEF DESCRIPTION OF THE DRAWINGS

The FIGURE is an exploded perspective view showing an exemplary embodiment of a transversely excited waveguide laser according to the principles of the present invention.

DESCRIPTION OF THE PREFERRED EMBODIMENTS

A transversely excited waveguide laser includes an elongated channel part or profile 1 with a longitudinally extending discharge channel in the form of a groove 11. The groove 11 is closed by an elongated cover part 4 which has the same thickness as a floor 15 under the groove 11. The channel part 1 and the cover part 4 together form a discharge profile or element. The cover part 4 is soldered onto a solder surface 16 of the channel part 1 with a glass solder. In one embodiment, the discharge channel formed by the cover 4 over the groove 11 is rotationally symmetrical, although in another embodiment the discharge channel is rectangular.

An elongated cooling profile, or element 2 having a solder surface 7 at one elongated side is soldered onto a solder surface 17 of the cover part 4, while a respective cooling profile 3 having a corresponding solder surface 19 is soldered onto the solder surface 18 of the channel part 1. The cooling profiles 2 and 3 each have an internal cooling channel 12 formed extending along the length thereof. The cooling channels 12 each have a generated surface facing the groove 11, where the generated surface is broader than a projection of the closest limiting surface of the discharge channel, in a preferred embodiment. A pair of end plates 6 are provided to close the cooling channels 12 and the discharge channel 11 in vacuum-tight fashion. The end plates 6 are soldered onto end faces 5 of the profile parts at each opposite end of a laser rod formed thereby. The described soldered connections are carried out with glass solder.

An interconnection, or flat lead, 8 is applied to the solder surface 17 of the cover part 4 and a second interconnection, or flat lead, 8 is applied to the solder surface 18 of the channel part 1. The interconnects 8 are suitable for transverse excitation of the laser gas by radio frequency signals. The interconnections 8 are preferrably applied by a silk screen process. Recesses 20 formed in the cooling profiles 2 and 3 provide access for contacting the interconnects 8. Thus, connecting means, not shown, can be easily electrically connected to the interconnects 8 once the laser is assembled so that an excitation signal can be fed thereto.

Bores 21 proceeding from the cooling channels 12 to the outer limiting surfaces of the profiles 2 and 3 are provided. Solder surfaces 9 onto which water connections 10 are soldered are provided in the region of the bores 21. Cooling water is pumped through the water connections 10 from a water pumping and cooling source W, shown schematically, and through the cooling channels 12.

The cover plates 6 at opposite ends of the laser rod contain passages or openings 22 which leave the groove 11 free. Mirror mounts 14 are soldered onto the outside surfaces of the end plates 6 in the region of solder zones 13. The mirror mounts 14 are shown as cylindrical elements soldered to annular solder zones 13.

The chanal profile 11 and the cooling profiles 2 and 3, as well as the end plate 6 are preferrably composed of $Al_2O_3$ ceramic and, thus, all have the same coefficient of temperature expansion when compared to one another. It is also contemplated to form the profile elements of BN or AlN ceramic, as well. It is important that all profile parts of an individual laser be formed of the same material so that the same coefficient of thermal expansion results. The water connections 10 and the mirror mounts 14 are preferrably composed of a metal having a matched coefficient of temperature expansion. The solder regions 9 and 13 contain normal metal-ceramic solder connections.

Although other modifications and changes may be suggested by those skilled in the art, it is the intention of the inventors to embody within the patent warranted hereon all changes and modifications as reasonably and properly come within the scope of their contribution to the art.

We claim:

1. A transversely excited waveguide laser, comprising:
    a rod of vacuum-suitable high-temperature insulating material,
    said rod having at least one discharge profile portion containing at least one discharge channel formed by a groove in said at least one discharge profile portion, said at least one discharge profile portion having solder surfaces at two opposite sides of said at least one discharge channel;
    said rod having two cooling profile parts having approximately the same coefficient of temperature expansion as said at least one discharge profile portion, each of said cooling profile parts containing a cooling channel arranged symmetrically to said at least one discharge channel, one of said cooling profile parts soldered to each of said solder surfaces of said at least one discharge profile portion along their entire longitudinal extent, said cooling channels having generated surfaces facing toward said discharge channel, said generated surfaces being broader than a perpendicular projection of a closest limiting surface of said discharge channel on said generated surface of said cooling channel facing toward said discharge channel, and
    a soldered-on end plate at each end face of said rod terminating said cooling channels.

2. A transversely excited waveguide laser as claimed in claim 1, wherein said discharge channel has a cross section that is rotationally symmetrical.

3. A transversely excited waveguide laser as claimed in claim 1, wherein said discharge channel has a limiting surface facing toward said cooling channel that is planar,
    said cooling channel having a generated surface facing toward said discharge channel that is planar and parallel to said limiting surface of said discharge channel, and said cooling channel having a cross section that is mirror-symmetrical relative to a surface normal on a corresponding one of said limiting surfaces of said discharge channel.

4. A transversely excited waveguide laser as claimed in claim 3, wherein said cooling channels and said discharge channel each have rectangular cross sections.

5. A transversely excited waveguide laser as claimed in claim 1, wherein said discharge profile part includes a channel part and a cover part, said channel part having a groove forming said discharge channel, said cover part having a thickness the same as a thickness of a wall in said channel part under said groove, said cover part having a width the same as the width of said channel part, said cover part being arranged above said groove, and said two cooling profile parts being formed of identical extruded profiles.

6. A trasnversely excited waveguide laser as claimed in claim 1, further comprising:
   interconnects suitable as electrodes for transverse excitation of a laser gas and being applied to each of said two solder surfaces of said discharge profile portion at a side facing away from said discharge channel.

7. A transversely excited waveguide laser as claimed in claim 1, wherein said discharge profile portion and said cooling profile parts and said end plates are all composed of the same material and are soldered together with a glass solder.

8. A transversely excited waveguide laser as claimed in claim 1, wherein said end plates each include an opening in an area of said discharge channel, and further comprising:
   mirror carriers of metal having a coefficient of temperature expansion matched to said insulating material and being soldered onto said end plates.

9. A transversely excited waveguide laser as claimed in claim 1, wherein said two cooling profile parts are of rectangular section having openings in a region of their end faces, said openings leading outward from said cooling channel, and further comprising:
   cooling water connections soldered to said openings.

10. A transversely excited waveguide laser as claimed in claim 1, wherein said discharge channel has a cross-sectional area of between approximately 1 square mm through 16 square mm.

11. A transversely excited waveguide laser as claimed in claim 1, wherein an overall wall thickness between said discharge channel and a neighboring one of said cooling channels is no greater than an extent of said discharge channel in a direction of a surface normal on said solder surfaces of said discharge profile portion.

12. A transversely excited waveguide laser as claimed in claim 1, wherein said solder surfaces of said cooling profile parts and said solder surfaces of said discharge profile portion are ground planar.

13. A transversely excited waveguide laser as claimed in claim 1, wherein said at least one discharge profile portion and said two cooling profile parts are all formed of ceramic.

14. A transversely excited waveguide laser as claimed in claim 13, wherein said profiles are of a material selected from the group of $Al_2O_3$, BN, AlN.

* * * * *